United States Patent
Narita

(10) Patent No.: US 11,551,112 B2
(45) Date of Patent: Jan. 10, 2023

(54) INFORMATION PROCESSING APPARATUS AND STORAGE MEDIUM

(71) Applicant: TOKYO ELECTRON DEVICE LIMITED, Kanagawa (JP)

(72) Inventor: Takayoshi Narita, Kanagawa (JP)

(73) Assignee: TOKYO ELECTRON DEVICE LIMITED, Kanagawa (JP)

( * ) Notice: Subject to any disclaimer, the term of this patent is extended or adjusted under 35 U.S.C. 154(b) by 449 days.

(21) Appl. No.: 16/648,020

(22) PCT Filed: Oct. 12, 2018

(86) PCT No.: PCT/JP2018/038148
§ 371 (c)(1),
(2) Date: Mar. 17, 2020

(87) PCT Pub. No.: WO2019/097916
PCT Pub. Date: May 23, 2019

(65) Prior Publication Data
US 2020/0279177 A1 Sep. 3, 2020

(30) Foreign Application Priority Data

Nov. 16, 2017 (JP) .............. JP2017-221038

(51) Int. Cl.
*G06N 5/04* (2006.01)
*G06F 16/28* (2019.01)
*G06N 20/00* (2019.01)
*G06F 16/31* (2019.01)
*G06F 16/35* (2019.01)

(52) U.S. Cl.
CPC ............. *G06N 5/04* (2013.01); *G06F 16/285* (2019.01); *G06F 16/313* (2019.01); *G06F 16/35* (2019.01); *G06N 20/00* (2019.01)

(58) Field of Classification Search
CPC ............................. G06F 16/313; G06F 16/35
See application file for complete search history.

(56) References Cited

U.S. PATENT DOCUMENTS

| 10,102,451 | B2 * | 10/2018 | Han ..................... G06N 20/00 |
| 10,360,215 | B1 * | 7/2019 | Ciarlini ............... G06F 16/2264 |
| 11,069,335 | B2 * | 7/2021 | Pollet ................... G06N 3/0445 |
| 2018/0173813 | A1 * | 6/2018 | Spiro ..................... G06N 20/00 |
| 2019/0065620 | A1 * | 2/2019 | Murray ............... G06F 16/9024 |

(Continued)

FOREIGN PATENT DOCUMENTS

| JP | 2013-003706 | 1/2013 |
| JP | 2017-174045 | 9/2017 |

OTHER PUBLICATIONS

International Search Report for PCT/JP2018/038148 dated Nov. 27, 2018.

(Continued)

*Primary Examiner* — Dangelino N Gortayo
(74) *Attorney, Agent, or Firm* — IPUSA, PLLC

(57) ABSTRACT

An information processing apparatus according to an embodiment includes an aligner that aligns, with reference to a reference data set that is a sequential data set, another sequential data set; and a target data extractor that extracts a portion of the another sequential data set corresponding to the reference data set as a target data set.

10 Claims, 9 Drawing Sheets

(56) References Cited

U.S. PATENT DOCUMENTS

2019/0087186 A1 3/2019 Endo
2019/0173795 A1* 6/2019 Ayodhya ............. H03M 7/3082

OTHER PUBLICATIONS

Japanese Office Action for JP2017-221038 dated Sep. 10, 2019.
Japanese Office Action for JP2017-221038 dated Mar. 10, 2020.
Fakamitsu Matsubara, Sang-Ho Hyon, and Jun Morimoto, "Stylistic Prediction for Human Periodic Motions", The IEICE Transactions on Information and Systems (Japanese Edition) vol. J94-D, No. 1, Publication Date: Jan. 1, 2011, From pp. 344-355 with Partial Translation.
Yasuaki Nishida and Yutaka Sakaguchi, "A system predicting the endpoint of 3D reaching movement based on the spatiotemporal structure of whole-body motor synergy", IEICE Technical Report vol. 112, No. 480, Publication Date: Mar. 6, 2013, From pp. 129-134 with English abstract.

* cited by examiner

FIG.4

| TIME OF MEASUREMENT | x | y | z |
|---|---|---|---|
| 9:30:00 | 1.02 | 4.34 | 0.00 |
| 9:30:01 | 1.06 | 3.35 | 0.23 |
| 9:30:02 | 0.32 | 6.25 | 3.20 |
| ... | ... | ... | ... |

INFORMATION PROCESSING APPARATUS AND STORAGE MEDIUM

TECHNICAL FIELD

The present invention relates to an information processing apparatus and a storage medium.

BACKGROUND ART

In a known technology, a determination model is generated by performing machine learning on training data sets, and labels of determination target data sets are determined using the determination model. Such a technology is used, for example, to detect a failure of a device based on sensor data obtained by a sensor provided on the device.

Generally, when a determination model is generated, preprocessing (normalization, size adjustment, etc.) is performed on the training data sets. Similarly, when the labels of determination target data sets are determined, preprocessing is performed on the determination target data sets. Preprocessing of data makes it possible to improve the determination accuracy of the determination model itself and the determination accuracy in actually performing determination using the determination model.

RELATED-ART DOCUMENT

[Patent Document]
[Patent Document 1] Japanese Laid-Open Patent Publication No. 2017-174045

DISCLOSURE OF INVENTION

Problems to be Solved by the Invention

An appropriate preprocessing method for data varies depending on the type of the data. For this reason, preprocessing and the construction of preprocessing methods are typically performed by experts such as data scientists. Accordingly, it takes a lot of effort to generate a determination model and determine labels of determination target data sets.

The present invention is made in view of the above problem, and one object of the present invention is to automate preprocessing of data.

Means for Solving the Problems

An information processing apparatus according to an embodiment includes an aligner that aligns, with reference to a reference data set that is a sequential data set, another sequential data set; and a target data extractor that extracts a portion of the another sequential data set corresponding to the reference data set as a target data set.

Advantageous Effect of the Invention

An embodiment of the present invention makes it possible to automate preprocessing of data.

BRIEF DESCRIPTION OF THE DRAWINGS

FIG. 4 is a drawing illustrating an example of a sequential data set D;

DESCRIPTION OF EMBODIMENTS

Embodiments of the present invention are described below with reference to the accompanying drawings. In the descriptions of the embodiments in the specification and the drawings, the same reference number is assigned to components having substantially the same functional configuration, and repeated descriptions of those components are omitted.

A determination system 100 according to an embodiment is described with reference to FIGS. 1-9. The determination system 100 of the present embodiment generates a determination model by performing machine learning on training data sets, and determines labels of determination target data sets using the determination model.

Figure 1:
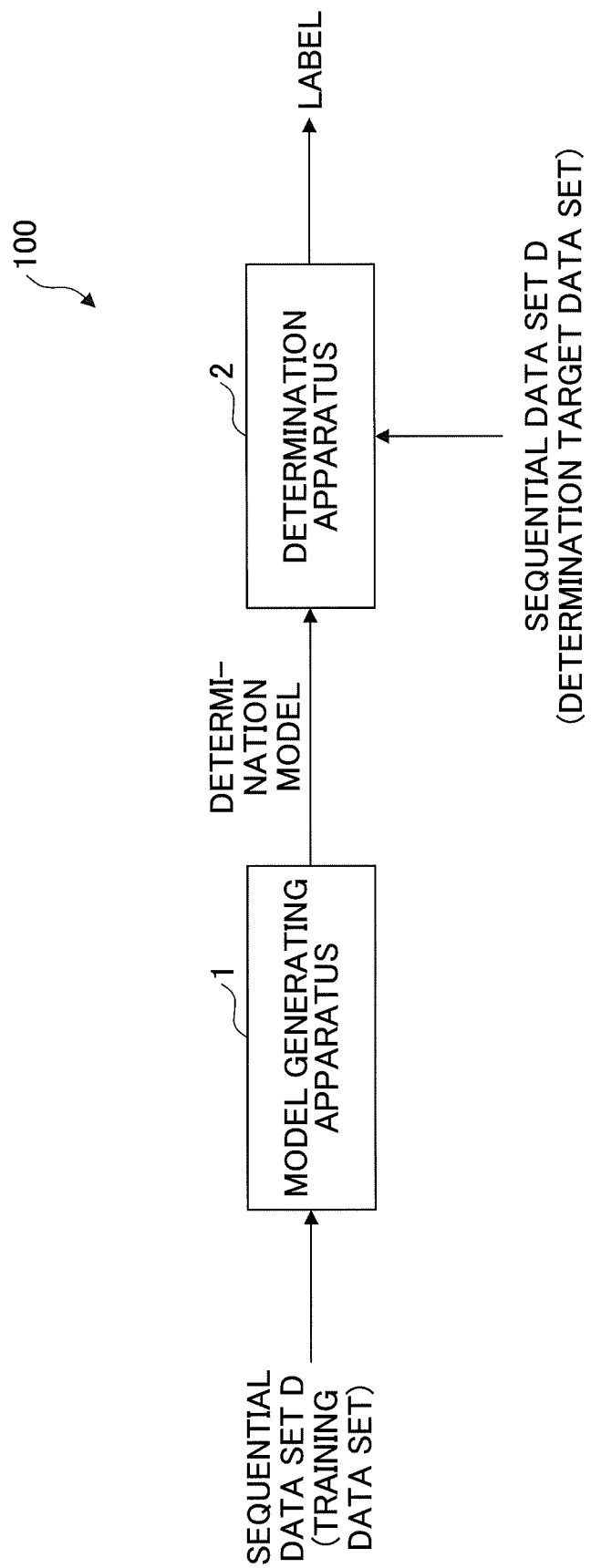
FIG. 1 is a drawing illustrating an example of a configuration of a determination system.

First, a configuration of the determination system 100 is described. FIG. 1 is a drawing illustrating an example of a configuration of the determination system 100. The determination system 100 in FIG. 1 includes a model generating apparatus 1 and a determination apparatus 2.

The model generating apparatus 1 is an example of an information processing apparatus or a computer that receives training data sets (sequential data sets D with labels) and generates, based on the training data sets, a determination model for determining labels of sequential data sets D. The model generating apparatus 1 is, for example, but is not limited to, a personal computer (PC), a server, a smartphone, a tablet terminal, or a microcomputer. Each sequential data set D includes records that are arranged in a predetermined order, and each record includes one or more data items. Examples of sequential data sets D include time-series data, image data converted into a one-dimensional array, and text data. Examples of time-series data include sensor data and audio data. Two or more types of labels may be assigned to a sequential data set D.

The determination apparatus 2 is an example of an information processing apparatus or a computer that receives determination target data sets (sequential data sets D), and determines labels of the determination target data sets using the determination model generated by the model generating apparatus 1. The determination apparatus 2 is, for example, but is not limited to, a PC, a server, a smartphone, a tablet terminal, or a microcomputer. Labels may be assigned to or may not be assigned to the determination target data sets.

In the example of FIG. 1, the model generating apparatus 1 and the determination apparatus 2 are implemented by different computers. However, the model generating apparatus 1 and the determination apparatus 2 may be implemented by the same computer. The determination apparatus 2 may determine the labels of the sequential data sets D using a determination model different from the determination model generated by the model generating apparatus 1.

Figure 2:
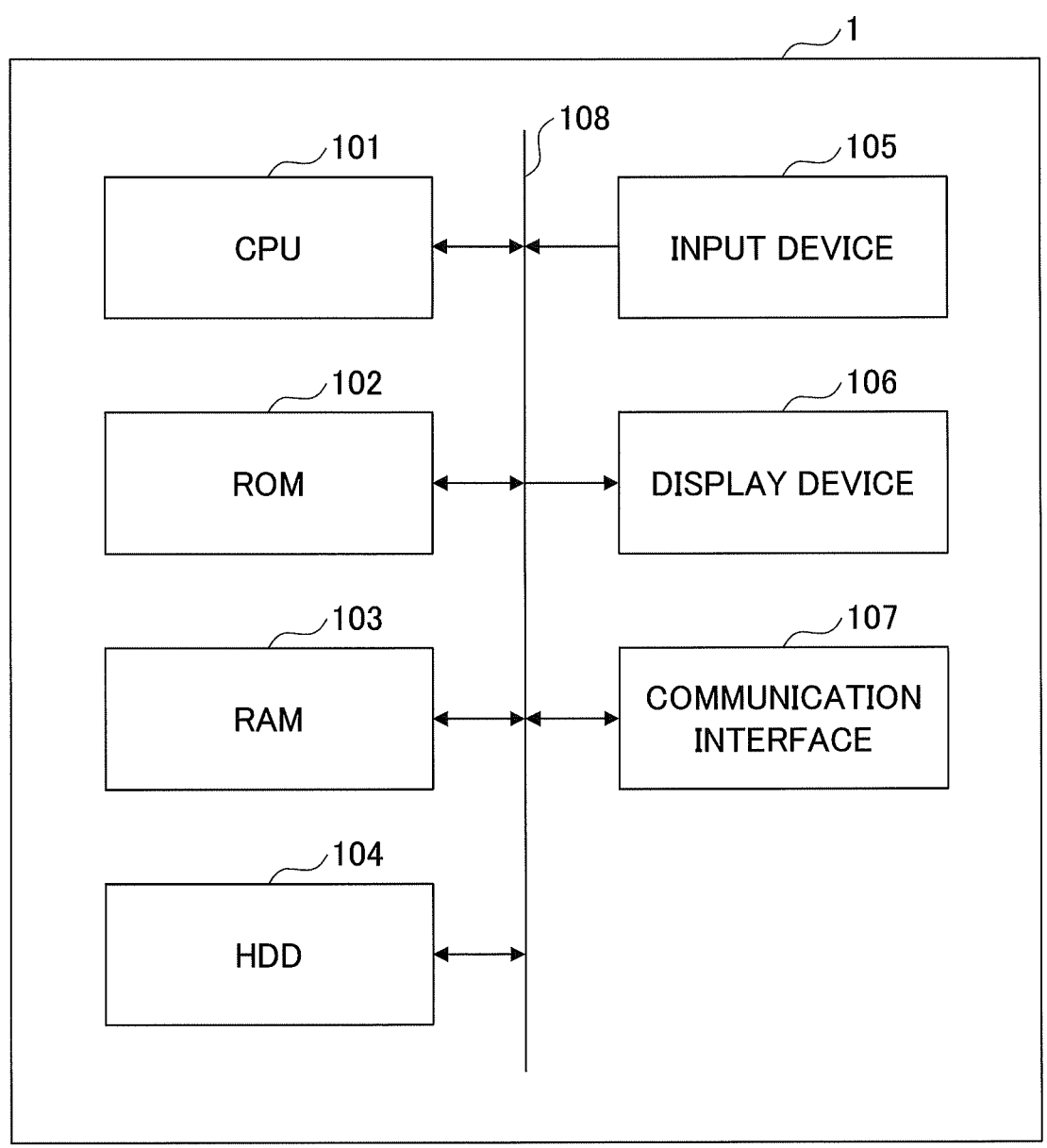
FIG. 2 is a drawing illustrating an example of a hardware configuration of a model generating apparatus.

Next, a hardware configuration of each of the model generating apparatus 1 and the determination apparatus 2 is described. FIG. 2 is a drawing illustrating an example of a hardware configuration of the model generating apparatus 1. The model generating apparatus 1 of FIG. 2 includes a central processing unit (CPU) 101, a read-only memory (ROM) 102, a random access memory (RAM) 103, a hard disk drive (HDD) 104, an input device 105, a display device 106, a communication interface 107, and a bus 108.

The CPU 101 executes programs to control components of the model generating apparatus 1 and implement functions of the model generating apparatus 1.

The ROM 102 stores various types of data including programs executed by the CPU 101.

The RAM 103 provides a work area for the CPU 101.

The HDD 104 stores various types of data including programs executed by the CPU 101.

The input device 105 inputs information corresponding to a user operation to the model generating apparatus 1. The input device 105 includes a keyboard, a mouse, a touch panel, and hardware buttons.

The display device 106 displays a screen according to a user operation. The display device 106 includes a liquid crystal display, a plasma display, and an organic electroluminescence (EL) display.

The communication interface 107 connects the model generating apparatus 1 to a network such as the Internet or a local area network (LAN) via wire or wirelessly. The model generating apparatus 1 may be connected to the determination apparatus 2 via a network.

The bus 108 connects the CPU 101, the ROM 102, the RAM 103, the HDD 104, the input device 105, the display device 106, and the communication interface 107 to each other.

The hardware configuration of the model generating apparatus 1 is not limited to the example of FIG. 2. The model generating apparatus 1 may have any configuration including the CPU 101, the ROM 102, and the RAM 103. The hardware configuration of the determination apparatus 2 is substantially the same as that of the model generating apparatus 1, and therefore its description is omitted here.

Figure 3:
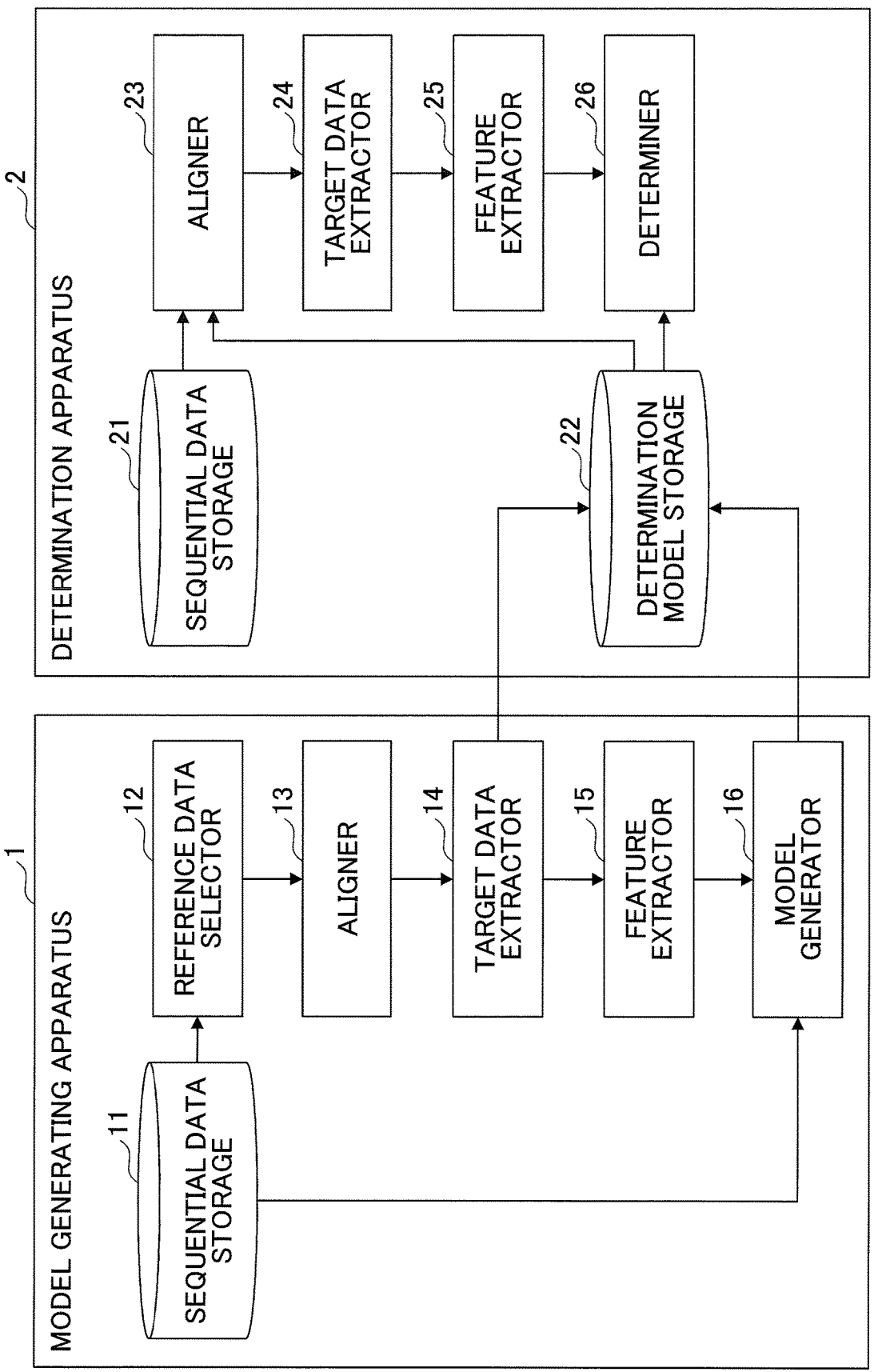
FIG. 3 is a drawing illustrating examples of functional configurations of a model generating apparatus and a determination apparatus.

Next, functional configurations of the model generating apparatus 1 and the determination apparatus 2 are described. FIG. 3 is a drawing illustrating examples of functional configurations of the model generating apparatus 1 and the determination apparatus 2.

First, the functional configuration of the model generating apparatus 1 is described. The model generating apparatus 1 of FIG. 3 includes a sequential data storage 11, a reference data selector 12, an aligner 13, a target data extractor 14, a feature extractor 15, and a model generator 16. The sequential data storage 11 is implemented by, for example, the ROM 102, the RAM 103, and/or the HDD 104. The reference data selector 12, the aligner 13, the target data extractor 14, the feature extractor 15, and the model generator 16 are implemented by executing a program(s) by the CPU 101.

The sequential data storage 11 stores multiple sequential data sets D (training data sets) to which labels are assigned. Each sequential data set D is stored as a data file. The sequential data sets D stored in the sequential data storage 11 may have the same size or different sizes.

FIG. 4 is a drawing illustrating an example of a sequential data set D. The sequential data set D of FIG. 4 is sensor data of an acceleration sensor, and includes multiple records that are arranged in order of measurement time. Each record includes values (data) of three data items in an x-axis direction, a y-axis direction, and a z-axis direction. Thus, the sequential data set D may include multiple data items or one data item. In the sequential data storage 11, sequential data sets D as exemplified by FIG. 4 are stored in association with labels.

The reference data selector 12 selects a reference data set D0 from the sequential data sets D stored in the sequential data storage 11. The reference data set D0 is a sequential data set D that serves as a reference for alignment by the aligner 13. The reference data selector 12 may randomly select the reference data set D0, or may select the reference data set D0 according to an algorithm. Any method may be used to select the reference data set D0.

Generally, each sequential data set D to be learned includes a characteristic pattern. However, it is not known which data item in the sequential data set D contains the pattern. If machine learning is performed using a data item that does not include a characteristic pattern, an accurate determination model may not be generated.

Therefore, when multiple data items are included in each sequential data set D as in the example of FIG. 4, the reference data selector 12 may select one or more data items from the multiple data items as the reference data set D0. The reference data selector 12 is preferably configured to select, as the reference data set D0, a data item whose degree of similarity among the sequential data sets D is highest or one or more data items whose degree of similarity among the sequential data sets D is greater than or equal to a threshold value. The degree of similarity may be calculated by a cross-correlation method or a dynamic time warping method. With this configuration, the reference data selector 12 can select a data item(s) that is likely to include a characteristic pattern as the reference data set D0.

The reference data selector 12 may perform preprocessing such as normalization on the sequential data sets D before selecting the reference data set D0.

The aligner 13 aligns other sequential data sets D stored in the sequential data storage 11 with reference to the reference data set D0 selected by the reference data selector 12. When one or more data items are selected as the reference data set D0 from multiple data items by the reference data selector 12, the aligner 13 aligns the one or more data items, which are selected by the reference data selector 12, in other sequential data sets D with reference to the reference data set D0.

Generally, a sequential data set D to be learned includes a characteristic pattern. However, the position where the pattern is included varies depending on the sequential data set D. For this reason, if machine learning is performed with sequential data sets D whose start points are aligned, it may not be possible to generate an accurate determination model due to differences in positions of characteristic patterns in the sequential data sets D.

Therefore, the aligner 13 aligns each sequential data set D such that the position of the characteristic pattern included in the sequential data set D matches the position of the characteristic pattern included in the reference data set D0. Specifically, the aligner 13 moves the start points of other sequential data sets D with reference to the reference data set D0 such that the degree of similarity between the reference data set D0 and the other sequential data sets D increases. In this process, the aligner 13 may perform interpolation or thinning of data as necessary. The degree of similarity may be calculated by a cross-correlation method or a dynamic time warping method. The aligner 13 is preferably configured to move the start points of other sequential data sets D such that the degree of similarity between the reference data set D0 and the other sequential data sets D is maximized. With this configuration, the aligner 13 can match the position of the characteristic pattern in each sequential data set D with the position of the characteristic pattern included in the reference data set D0.

Figure 5:
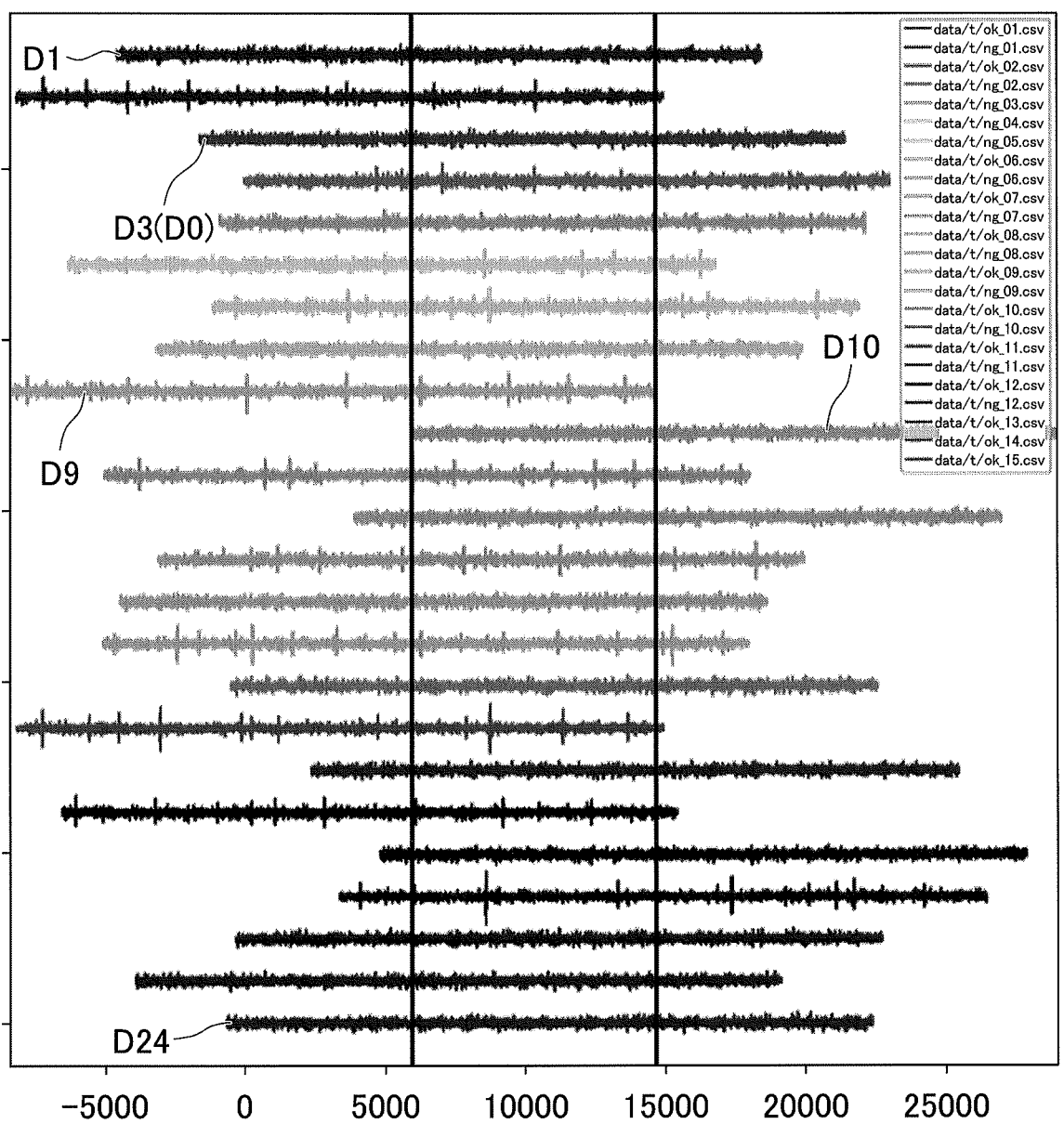
FIG. 5 is a drawing illustrating an example of aligned sequential data sets D.

FIG. 5 illustrates an example of aligned sequential data sets D. In the example of FIG. 5, 24 sequential data sets D1 through D24 labeled "ok" or "ng" are aligned with reference to the sequential data set D3 (reference data set D0). As illustrated in FIG. 5, other sequential data sets D1, D2, and D4-D24 are aligned by moving their start points relative to the reference data set D0.

The target data extractor 14 extracts, as target data sets, portions that are included in the other sequential data sets D aligned by the aligner 13 and correspond to (or overlap) the reference data set D0. The target data sets are data sets to be used in the subsequent processing. The target data sets extracted by the target data extractor 14 correspond to data sets used for machine learning to generate a determination model.

The target data extractor 14 extracts the same portion from each sequential data set D as a target data set. Also, the target data extractor 14 extracts, from the reference data set D0, a portion that is the same as the target data set extracted from each sequential data set D as a target data set.

As a result, from each of the reference data set D0 and the other sequential data sets D, a portion in a range where all of the sequential data sets D overlap each other is extracted as the target data set. The range where all the sequential data sets D overlap each other is between the start point of one of the aligned sequential data sets D whose start point is located in the rearmost position and the end point of one of the aligned sequential data sets D whose end point is located in the foremost position.

In the example of FIG. 5, the sequential data set D10 is the one of the aligned sequential data sets D whose start point is located in the rearmost position, and the sequential data set D9 is the one of the aligned sequential data sets D whose end point is located in the foremost position. Accordingly, portions of the sequential data sets D1 through D24 in a range between the start point of the sequential data set D10 and the end point of the sequential data set D9 (the range between solid lines in FIG. 5) are extracted as target data sets.

Figure 6:
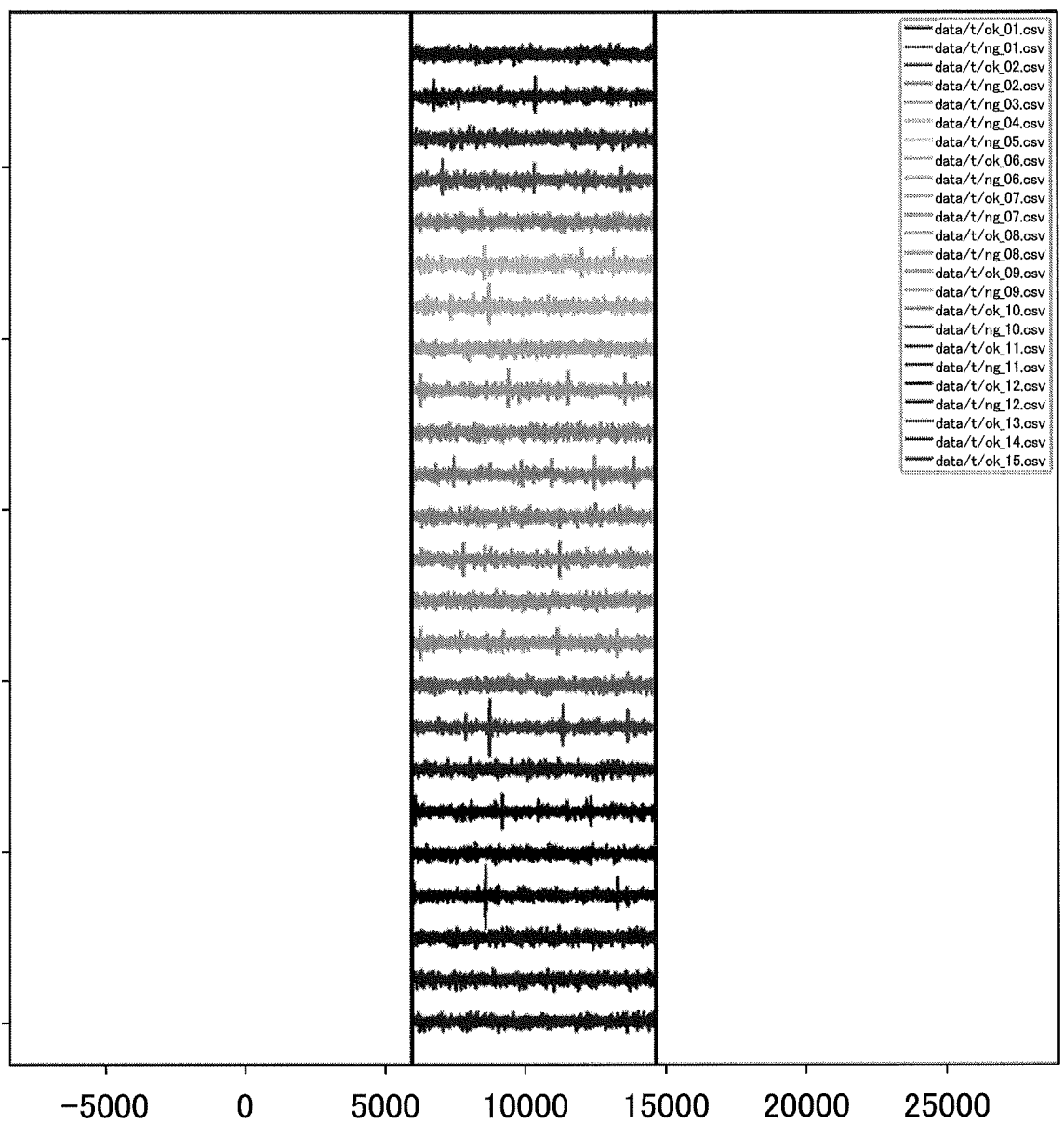
FIG. 6 is a drawing illustrating target data sets extracted from sequential data sets D1 through D24 in FIG. 5.

FIG. 6 is a drawing illustrating the target data sets extracted from the sequential data sets D1 through D24 in FIG. 5. As illustrated in FIG. 6, the target data sets have the same size. The target data sets are overlapping portions of the sequential data sets D whose characteristic patterns are aligned with each other, and therefore include the patterns. Subsequent processing is performed using these target data sets.

As described above, according to the present embodiment, the reference data selector 12 and the aligner 13 can automatically extract multiple target data sets, which have the same size and whose characteristic patterns are aligned with each other, from multiple sequential data sets D (training data sets) stored in the sequential data storage 11, which have different sizes and whose characteristic patterns are located in different positions. The model generating apparatus 1 generates a determination model using these target data sets, and therefore can generate an accurate determination model.

The feature extractor 15 extracts a feature from each of the multiple target data sets extracted by the target data extractor 14. The feature extractor 15 may extract a feature by a method such as a wavelet transform, a fast Fourier transform, a low-pass filter, and a high-pass filter. Any method may be used to extract a feature.

Figure 7:
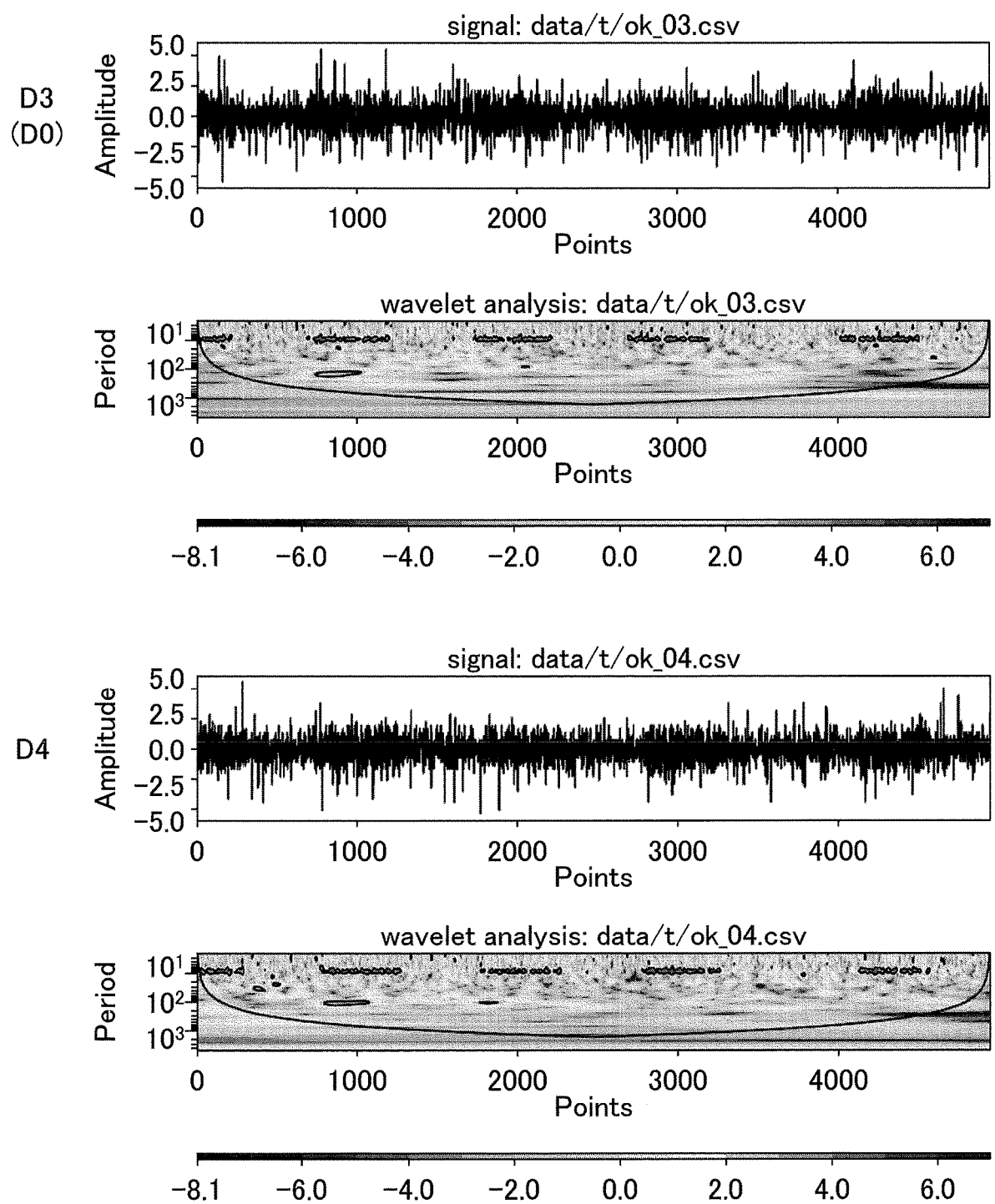
FIG. 7 is a drawing illustrating results of performing a wavelet transform on target data sets extracted from a sequential data set D3 (reference data set D0) and a sequential data set D4 in FIG. 5.

FIG. 7 is a drawing illustrating results of performing a wavelet transform on the target data sets extracted from the sequential data set D3 (reference data set D0) and the sequential data set D4 in FIG. 5. As illustrated in FIG. 7, the two target data sets include similar patterns. By performing a wavelet transform, such patterns can be extracted as features.

The model generator 16 performs machine learning to learn the relationships between multiple features extracted by the feature extractor 15 and labels assigned to the sequential data sets D from which the features are extracted and thereby generates a determination model for determining labels of sequential data sets D. Specifically, the model generator 16 generates determination models using multiple learning algorithms prepared in advance, and calculates the determination accuracy of each of the determination models generated by the learning algorithms by cross-validation. Then, the model generator 16 outputs one of the determination models having the highest determination accuracy as a determination model for determining the labels of sequential data sets D. This configuration makes it possible to automatically generate a determination model with a high determination accuracy.

The model generator 16 may use any learning algorithm such as random forest, support vector machine, logistic regression, or deep learning. When using a learning algorithm such as deep learning that can extract features, the model generator 16 may generate a determination model for determining labels of sequential data sets D by performing machine learning on the relationships between multiple target data sets extracted by the target data extractor 14 and labels assigned to the sequential data sets D from which the features are extracted. In this case, the feature extractor 15 is not necessary. Also, the model generator 16 may use both of a learning algorithm that generates a determination model based on features and a learning algorithm that generates a determination model based on target data sets.

Next, a functional configuration of the determination apparatus 2 is described. The determination apparatus 2 illustrated in FIG. 3 includes a sequential data storage 21, a determination model storage 22, an aligner 23, a target data extractor 24, a feature extractor 25, and a determiner 26. The sequential data storage 21 and the determination model storage 22 are implemented by, for example, the ROM, the RAM, and/or the HDD of the determination apparatus 2. The aligner 23, the target data extractor 24, the feature extractor 25, and the determiner 26 are implemented by executing a program(s) by the CPU of the determination apparatus 2.

The sequential data storage 21 stores one or more sequential data sets D (determination target data sets). Each sequential data set D is stored as a data file. The sequential data sets D stored in the sequential data storage 21 may have the same size or different sizes. Also, each sequential data set D may include multiple data items or one data item. Further, labels may be or may not be assigned to the sequential data sets D. Using sequential data sets D with no label as determination target data sets makes it possible to determine the labels of sequential data sets D whose labels are unknown. Also, using sequential data sets D with labels as determination target data sets makes it possible to determine the determination accuracy of the determination model.

The determination model storage 22 stores a determination model for determining labels of sequential data sets D. The determination model storage 22 may store a determination model generated by the model generating apparatus 1 or may store a determination model different from the determination model generated by the model generating apparatus 1.

Also, the determination model storage 22 stores a reference data set d0. The reference data set d0 is a sequential data set D used as a reference for alignment by the aligner 23. The reference data set d0 is preferably a sequential data set D that includes a characteristic pattern but includes only a small amount of (small-sized) portion that is not related to the characteristic pattern. Accordingly, the determination model storage 22 preferably stores, as the reference data set d0, a target data set extracted by the target data extractor 14 from the reference data set D0. The determination model storage 22 may store, as the reference data set d0, a target data set extracted by the target data extractor 14 from another sequential data set D, or any sequential data set D stored in the sequential data storage 11.

The aligner 23 aligns the sequential data sets D stored in the sequential data storage 21 with reference to the reference data set d0 stored in the determination model storage 22. When data items included in the reference data set d0 are different from data items included in the sequential data set D, the aligner 23 aligns a data item in the sequential data set D with the same type of data item in the reference data set d0 with reference to the reference data set d0.

The aligner 23 aligns each sequential data set D such that the position of a characteristic pattern included in the sequential data set D matches the position of the characteristic pattern included in the reference data set d0. Specifically, the aligner 23 moves the start point of the sequential data set D with reference to the reference data set d0 such that the degree of similarity between the reference data set d0 and the sequential data set D increases. In this process, the aligner 13 may perform interpolation or thinning of data as necessary. The degree of similarity may be calculated by a cross-correlation method or a dynamic time warping method. The aligner 23 is preferably configured to move the start point of the sequential data set D such that the degree of similarity between the reference data set d0 and the sequential data set D is maximized. With this configuration, the aligner 23 can match the position of the characteristic pattern in the sequential data set D with the position of the characteristic pattern included in the reference data set d0.

The aligner 23 may perform preprocessing such as normalization on the sequential data set D before aligning the sequential data set D.

The target data extractor 24 extracts, as a target data set, a portion that is included in the sequential data set D aligned by the aligner 23 and corresponds to (or overlaps) the reference data set d0. The target data set is data to be used in subsequent processing. The target data set extracted by the target data extractor 24 corresponds to data used to determine the label of the sequential data set D.

The corresponding (or overlapping) portions of the sequential data set D and the reference data set d0 are in a range between the start point of one of the reference data set d0 and the aligned sequential data set D whose start point is located behind the other and the end point of one of the reference data set d0 and the aligned sequential data set D whose end point is located in front of the other. Subsequent processing is performed using the target data set.

As described above, according to the present embodiment, the aligner 23 can automatically extract target data sets, which have the same size and whose characteristic patterns are aligned with each other, from sequential data sets D (determination target data sets) stored in the sequential data storage 21, which have different sizes and whose characteristic patterns are located in different positions. The determination apparatus 2 determines the labels of the sequential data sets D using these target data sets, and therefore can accurately determine the labels.

The feature extractor 25 extracts a feature from the target data set extracted by the target data extractor 24. The feature extractor 25 may extract a feature by a method such as a wavelet transform, a fast Fourier transform, a low-pass filter, and a high-pass filter. Any method may be used to extract a feature.

The determiner 26 determines the label of the sequential data set D by inputting the feature extracted by the feature extractor 25 to the determination model stored in the determination model storage 22.

Next, processes performed by the model generating apparatus 1 and the determination apparatus 2 are described.

Figure 8:
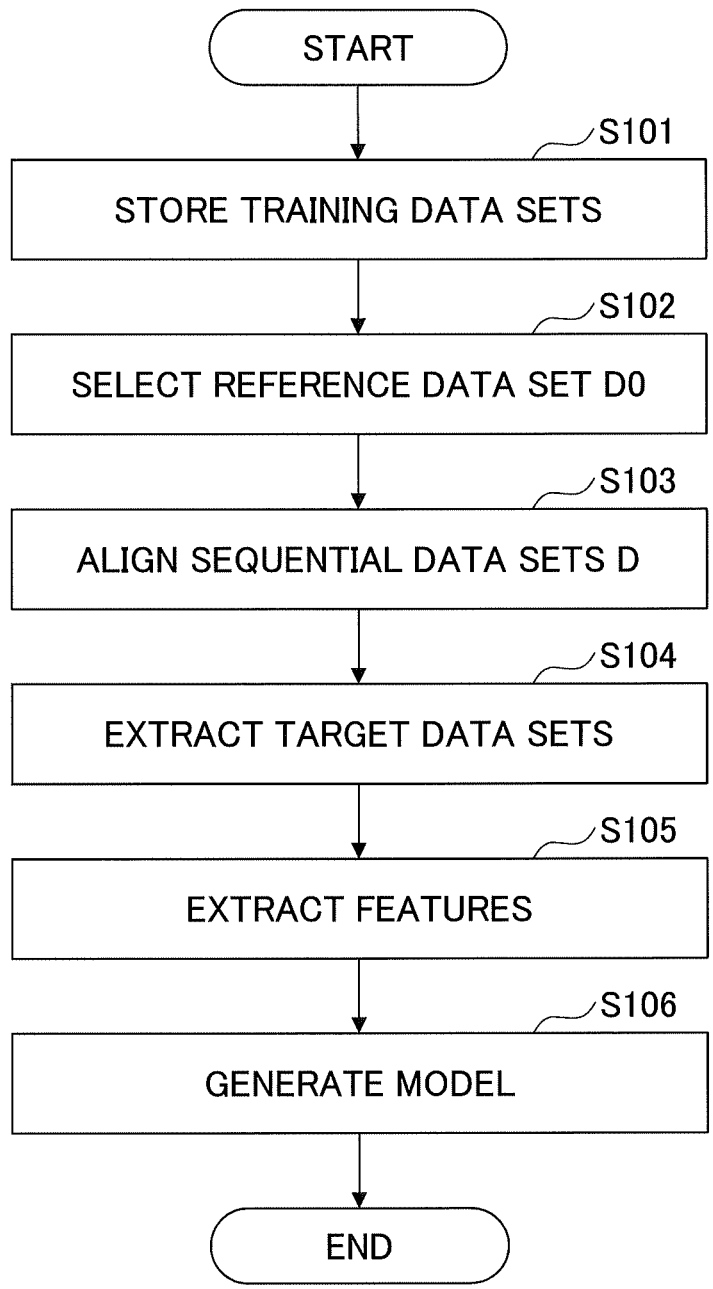
FIG. 8 is a flowchart illustrating an example of a process performed by a model generating apparatus.

First, a process performed by the model generating apparatus 1 is described. FIG. 8 is a flowchart illustrating an example of a process performed by the model generating apparatus 1. The process of FIG. 8 starts when a user of the model generating apparatus 1 inputs multiple training data sets (labeled sequential data sets D) to the model generating apparatus 1.

First, the sequential data storage 11 stores the training data sets input by the user (step S101). The training data sets may be input from a user terminal via a network, or may be input from a storage medium such as a CD-ROM.

Next, the reference data selector 12 reads sequential data sets D (training data sets) from the sequential data storage 11, and selects a reference data set D0 from the read sequential data sets D (step S102). The reference data selector 12 may select the reference data set D0 periodically, in response to a request from the user to generate a determination model, or each time new training data sets are added to the sequential data storage 11. The reference data selector 12 reports the sequential data sets D and a selection result (information indicating a sequential data set D selected as the reference data set D0) to the aligner 13.

When receiving the selection result from the reference data selector 12, the aligner 13 aligns other sequential data sets D with reference to the reference data set D0 (step S103). The aligner 13 reports, to the target data extractor 14, the sequential data sets D and an alignment result (information indicating the positions of the start points of the aligned other sequential data sets D relative to the start point of the reference data set D0).

When receiving the alignment result, the target data extractor 14 extracts target data sets from the reference data set D0 and the other sequential data sets D (step S104). The target data extractor 14 reports, to the feature extractor 15, the sequential data sets D and an extraction result (information indicating the start points and the end points of the target data sets in the sequential data sets D). Also, the target data extractor 14 sends the target data set extracted from the reference data set D0 to the determination apparatus 2. When receiving the target data set, the determination model storage 22 of the determination apparatus 2 stores the target data set as a new reference data set d0.

When receiving the extraction result from the target data extractor 14, the feature extractor 15 extracts features from the target data sets (step S105). The feature extractor 15 reports, to the model generator 16, the sequential data sets D and an extraction result (features extracted from the target data sets).

When receiving the extraction result from the feature extractor 15, the model generator 16 reads labels of the sequential data sets D from the sequential data storage 11, performs machine learning on the relationships between the features of the sequential data sets D and the labels, and generates a determination model (step S106). The model generator 16 sends the generated determination model to the determination apparatus 2. When receiving the determination model, the determination model storage 22 of the determination apparatus 2 stores the determination model as a new determination model.

Through the above process, the model generating apparatus 1 can automatically generate a determination model. The model generating apparatus 1 may be configured to display the result obtained in each step on the display device 106 so that the user of the model generating apparatus 1 can check the result. For example, the model generating apparatus 1 may display, on the display device 106, an input screen for inputting training data sets, an alignment result as illustrated in FIG. 5, a target data extraction result as illustrated in FIG. 6, a generated determination model, and the determination accuracy of the determination model.

Figure 9:
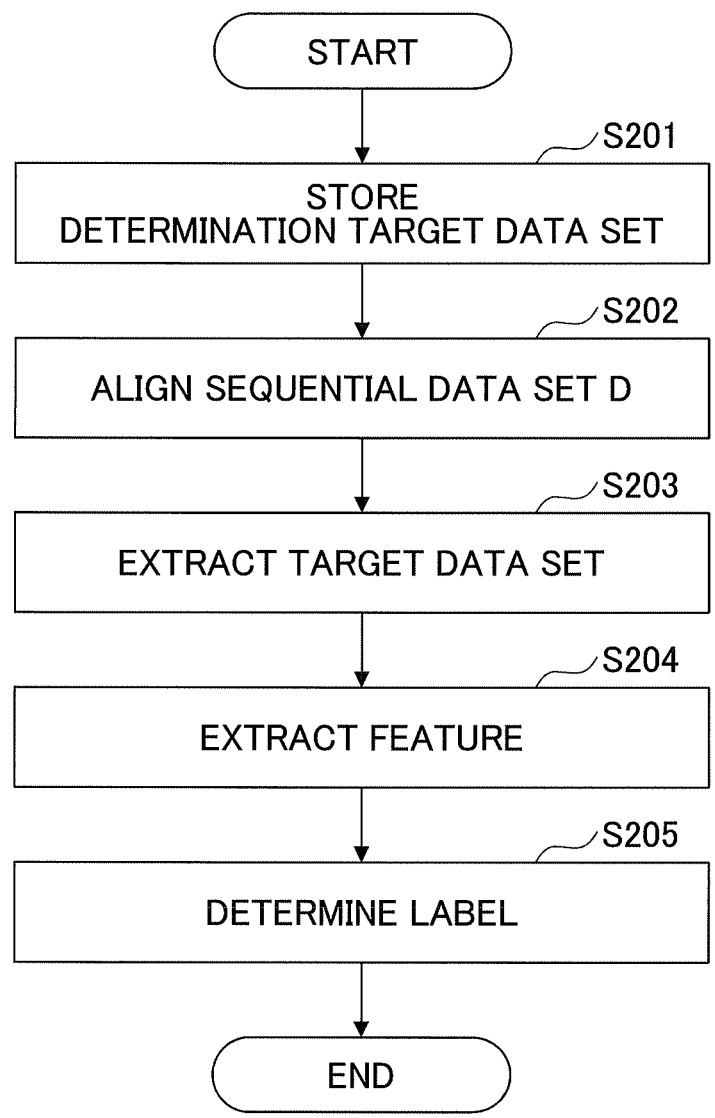
FIG. 9 is a flowchart illustrating an example of a process performed by a determination apparatus.

Next, a process performed by the determination apparatus 2 is described. FIG. 9 is a flowchart illustrating an example of a process performed by the determination apparatus 2. The process of FIG. 9 starts when a user of the determination apparatus 2 inputs a determination target data set (sequential data set D) to the determination apparatus 2.

First, the sequential data storage 21 stores the determination target data set input by the user (step S201). The determination target data set may be input from a user terminal via a network, or may be input from a storage medium such as a CD-ROM.

Next, the aligner 23 reads the sequential data set D (determination target data set) from the sequential data storage 21, reads the reference data set d0 from the determination model storage 22, and aligns the sequential data set D with reference to the reference data set d0 (step S202). The aligner 23 may align the sequential data set D periodically, in response to a label determination request from the user, or each time when a new determination target data set is added to the sequential data storage 21. The aligner 23 reports, to the target data extractor 24, the sequential data set D and an alignment result (information indicating the position of the start point of the aligned sequential data set D relative to the start point of the reference data set d0).

When receiving the alignment result, the target data extractor 24 extracts a target data set from the sequential data set D (step S203). The target data extractor 24 reports, to the feature extractor 25, an extraction result (information indicating the start point and the end point of the target data set in the sequential data set D).

When receiving the extraction result from the target data extractor 24, the feature extractor 25 extracts a feature from the target data set (step S204). The feature extractor 25 reports an extraction result (the feature extracted from the target data set) to the determiner 26.

When receiving the extraction result from the feature extractor 25, the determiner 26 reads the determination model from the determination model storage 22, and inputs the feature to the determination model to determine the label of the sequential data set D (step S205).

Through the above process, the determination apparatus 2 can automatically determine the label of the sequential data set D. The determination apparatus 2 may be configured to display the result obtained in each step on a display device so that the user of the determination apparatus 2 can check the result. For example, the determination apparatus 2 may display, on a display device, an input screen for inputting a determination target data set, an alignment result as illustrated in FIG. 5, an extraction result of a target data set as illustrated in FIG. 6, and a determination result (a label of a sequential data set D) of determining the label of the sequential data set D.

As described above, the present embodiment makes it possible to automate preprocessing (alignment and size adjustment) of sequential data sets D having different sizes and including characteristic patterns in different positions. Also, the present embodiment makes it possible to automatically generate an accurate determination model from multiple training data sets. Further, the present embodiment makes it possible to automatically and accurately determine the label of a determination target data set.

For example, assume a case where the determination system 100 of the present embodiment is used to detect a failure of a device installed in, for example, a factory. In this case, the user of the determination system 100 installs a sensor (such as an acceleration sensor or a temperature sensor) for detecting a device failure on the device, and collects sensor data measured when the device is in normal condition and sensor data measured when the device is failed. Next, the user assigns a label "normal" to the sensor data collected when the device is in normal condition, assigns a label "failed" to the sensor data collected when the device is failed, and inputs the sensor data as training data sets to the model generating apparatus 1. As described above, when the sensor data (training data sets) is input, the model generating apparatus 1 automatically generates a determination model for determining whether the label of sensor data is "normal" or "failed". That is, the user can easily obtain a determination model without performing preprocessing on the sensor data. The sensor may be connected directly or via a network to the model generating apparatus 1 so that sensor data is automatically input to the model generating apparatus 1 from the sensor. In this case, the user may set a label to be assigned to the input sensor data in advance. Also, the model generator 16 may be configured to generate a determination model by using a learning algorithm such as the k-means method capable of unsupervised learning.

Thereafter, the user periodically inputs sensor data to the determination apparatus 2 as a determination target data set. As described above, when the sensor data (determination target data set) is input, the determination apparatus 2 automatically determines whether the label of the sensor data is "normal" or "failed" based on the determination model. That is, the user can easily determine the label (device condition) of sensor data in real time without performing preprocessing on the sensor data. The sensor may be connected directly or via a network to the determination apparatus 2 so that sensor data is automatically input to the determination apparatus 2 from the sensor.

Thus, the present embodiment makes it possible to reduce the workload required to generate a determination model and determine the label of a determination target data set, and thereby makes it possible to reduce the time and cost required for manufacturing the model generating apparatus 1 and the determination apparatus 2. This in turn makes it possible to facilitate the use of sequential data sets D such as sensor data.

The present invention is not limited to the configuration described in the above embodiment, and variations and modifications may be made without departing from the scope of the present invention depending on the application of the present embodiment. For example, the above-described configuration may be combined with other components.

This international application is based upon and claims priority to Japanese Patent Application No. 2017-221038, filed on Nov. 16, 2017, the entire contents of which are incorporated herein by reference.

EXPLANATION OF REFERENCE NUMERALS

1: model generating apparatus
2: determination apparatus
11: sequential data storage
12: reference data selector
13: aligner
14: target data extractor
15: feature extractor
16: model generator
21: sequential data storage
22: determination model storage
23: aligner
24: target data extractor
25: feature extractor
26: determiner
100: determination system

The invention claimed is:

1. An information processing apparatus, comprising:
a memory that stores sequential data sets associated with labels and that comprise characteristic patterns, wherein the sequential data sets comprise a first sequential data set that is a reference data set and one or more second sequential data sets; and
a processor connected to the memory and that:
causes a position of the characteristic pattern of each of the second sequential data sets to be aligned with a position of the characteristic pattern of the first sequential data set so that a degree of similarity between the first sequential data set and each of the second sequential data sets increases;
extracts a portion of each of the second sequential data sets that overlaps the first sequential data set as a target data set; and
generates a determination model for determining a type of the labels of each of the second sequential data sets based on features extracted from the target data set,
wherein the target data set has a range between a start point of one of the second sequential data sets whose start point is located in a rearmost position and an end point of one of the second sequential data sets whose end point is located in a foremost position.

2. The information processing apparatus as claimed in claim 1, wherein the processor aligns each of the second sequential data sets such that a degree of similarity between the first sequential data set and each of the second sequential data sets increases.

3. The information processing apparatus as claimed in claim 2, wherein the processor aligns each of the second sequential data sets by a cross-correlation method or a dynamic time warping method.

4. The information processing apparatus as claimed in claim 1, wherein the processor extracts a feature from the target data set.

5. The information processing apparatus as claimed in claim 1, wherein the processor extracts same portions of multiple sequential data sets as target data sets.

6. The information processing apparatus as claimed in claim 1, wherein the processor selects the first sequential data set from multiple sequential data sets.

7. The information processing apparatus as claimed in claim 1, wherein the processor generates a determination model for determining a label of a sequential data set based on at least one of multiple target data sets and features extracted from the multiple target data sets.

8. The information processing apparatus as claimed in claim 7, wherein the processor generates determination models using multiple learning algorithms prepared in advance, and outputs one of the determination models that has a highest determination accuracy.

9. The information processing apparatus as claimed in claim 1, wherein the processor determines a label of the target data set based on a determination model for determining a label of the sequential data set.

10. A non-transitory computer-readable storage medium storing a program for causing a computer to execute a process comprising:
storing sequential data sets associated with labels and that comprise characteristic patterns, wherein the sequential data sets comprise a first sequential data set that is a reference data set and one or more second sequential data sets;
causing a position of the characteristic pattern of each of the second sequential data sets to be aligned with a position of the characteristic pattern of the first sequential data set so that a degree of similarity between the first sequential data set and each of the second sequential data sets increases;
extracting a portion of each of the second sequential data sets that overlaps the first sequential data set as a target data set; and
generating a determination model for determining a type of the labels of each of the second sequential data sets based on features extracted from the target data set,
wherein the target data set has a range between a start point of one of the second sequential data sets whose start point is located in a rearmost position and an end point of one of the second sequential data sets whose end point is located in a foremost position.

* * * * *